Patented Dec. 4, 1945

2,390,258

UNITED STATES PATENT OFFICE 2,390,258

HYDRAULIC PRESSURE FLUID

Donald L. Katz and Arnulf K. Esterer, Ann Arbor, Mich., assignors to Hydraulic Brake Company, Detroit, Mich., a corporation of California No Drawing. Application May 24, 1943, Serial No. 488,272

1 Claim. (Cl. 252—78)

This invention relates to hydraulic pressure fluids, such as brake fluids.

An object of the invention is to provide a fluid having as a main constituent a substance having a substantial lubricating value, due to its viscosity characteristics, and which is in the class of artificial resins polymerized into molecules of considerable size. An important feature relates to using with such a substance a chemical polishing agent capable of smoothing down the microscopic projections of the metal surfaces in order to aid in the lubricating effect.

Other objects are to provide a fluid complying with the present day requirements and to utilize materials which are on the market or which are known to be readily available.

The resin used in the fluid covered by the present application is that known commercially as "Santolite BK5," made and sold under that name by Monsanto Chemical Company of 435 North Michigan Avenue, Chicago, Illinois. It is a resinous material formed by aromatic sulfonamides condensed with formaldehyde. Approximately 10.00% of this material is dissolved in approximately 15% of a plasticizer which is not soluble in water, to keep the resin from flocking out in case of contamination of the liquid by taking up water. This may be either of the substances known commercially as "Pentac'zer 180," and "Pentacizer 176," preferably the former, as it has a better viscosity index. "Pentacizer 180" is an ester of pentaerythritol or of dipentaerythritol, which may be of the general formula $$(R\text{---}CO\text{---}O\text{---}CH_2)_2\text{---}C\text{---}(CH_2\text{---}O\text{---}CO\text{---}R)_2$$

or perhaps $$\text{---}(CH_2)_3 \equiv C\text{---}O\text{---}C \equiv (CH_2)_3\text{---}$$

in which R is an aliphatic hydrocarbon derivative. "Pentac'zer 176" is pentaerythritol diacetate dipropionate, with the formula $$(C_2H_5\text{---}CO\text{---}O\text{---}CH_2)_2\text{---}C\text{---}(CH_2\text{---}O\text{---}CO\text{---}CH_3)_2$$

Both are made and sold under these names by Heyden Chemical Corporation of 50 Union Square, New York, N. Y. Both of these ingredients may be broadly defined as esters of pentaerythritol and organic acids.

According to an important feature of the invention, the resin and plasticizer described above are used with approximately 5.00% of a chemical polishing agent such as tricresyl phosphate, sold commercially under the name "Lindol MP," substantially of the formula $O=P\equiv(O\text{---}C_6H_5.CH_3)_3$. This substance has a characteristic polishing action, gradually smoothing down the microscopic projections on the metal surfaces between which the fluid is required to act as a lubricant, by attacking chemically the microscopic projections of metal to form relatively soft compounds which accumulate in the microscopic depressions.

These substances are mixed with a suitable solvent, as, for example, 69.75% of carbitol (monoethyl ether of diethylene glycol, or $$HO\text{---}CH_2\text{---}CH_2\text{---}O\text{---}CH_2\text{---}CH_2\text{---}O\text{---}C_2H_5)$$

and with an inhibitor aiding in the resistance to corrosion by forming a coating on the metal parts. The preferred inhibitor is a mixture consisting of approximately .10% of diethanolamine and .15% diamylamine phosphate.

The above-described fluid has a satisfactorily low rate of change of viscosity with temperature changes; it has little effect on rubber; it does not freeze, but forms a clear gel at low temperatures; at —60° F. the meniscus returns to level after four seconds; its boiling point is 377° F.; its stability is such that it does not boil after two hours at 295° F.; its flash point is 220° F.; it mixes with the principal brake fluids already on the market, and the mixtures remain clear down to —40° F.; it has a water tolerance of 18.6% at 74° F.; if contaminated with 4% of water it remains clear at —40° F.; it does not corrode the metals used in brake systems; and its density is 8.999 lbs. per gallon at 69° F.

While the proportions and constituents of one fluid which we now regard as most advantageous are given above, it is not our intention to limit the scope of our invention thereby, or otherwise than by the terms of the appended claim.

We claim:

A hydraulic pressure fluid having approximately 10.00% of an aryl sulfonamide-formaldehyde resin, approximately 5.00% of tricresyl phosphate, approximately 15% of an ester of pentaerythritol and organic acid, approximately 69.75% of monoethyl ether of diethylene glycol, approximately .10% of diethanolamine, and approximately .15% of diamylamine phosphate.

DONALD L. KATZ.
ARNULF K. ESTERER.